(12) United States Patent
Delahay et al.

(10) Patent No.: US 6,890,501 B2
(45) Date of Patent: May 10, 2005

(54) METHOD FOR SIMULTANEOUSLY ABATING NITRIC OXIDES AND NITROUS OXIDES IN GASES CONTAINING THEM

(76) Inventors: Gerard Delahay, 414, rue de l'Aiguelongue, F-34090 Montpellier (FR); Mathias Mauvezin, 204, rue Emile Littre, F-34000 Montpellier (FR); Bernard Neveu, deceased, late of Paris (FR); by Genevieve Neveu, legal representative, 10bis, avenue de la Grande Armee, 75017 Paris (FR); Bernard M. Coq, 98, rue du Bosc, 34980 Montpellier (FR)

( * ) Notice: Subject to any disclaimer, the term of this patent is extended or adjusted under 35 U.S.C. 154(b) by 280 days.

(21) Appl. No.: 09/931,172

(22) Filed: Aug. 17, 2001

(65) Prior Publication Data

US 2002/0044902 A1 Apr. 18, 2002

Related U.S. Application Data

(63) Continuation of application No. PCT/FR00/00367, filed on Feb. 15, 2000.

(30) Foreign Application Priority Data

Feb. 18, 1999 (FR) .............................................. 99 01999

(51) Int. Cl.$^7$ ........................ B01J 29/064; C01B 21/00
(52) U.S. Cl. ........................ 423/239.2; 502/66; 502/67
(58) Field of Search ........................ 423/239.2; 502/66, 502/67

(56) References Cited

U.S. PATENT DOCUMENTS

| 3,308,069 | A | | 3/1967 | Wadlinger et al. |
| 5,516,497 | A | | 5/1996 | Speronello et al. |
| 5,520,895 | A | * | 5/1996 | Sharma et al. ........... 423/239.2 |
| 5,582,810 | A | * | 12/1996 | Tretjak ..................... 423/239.2 |
| 5,670,125 | A | * | 9/1997 | Sheu et al. ............... 423/239.2 |
| 6,221,324 | B1 | * | 4/2001 | Coq et al. ................. 423/239.2 |

FOREIGN PATENT DOCUMENTS

| EP | B-0393917 A | 10/1990 |
| GB | 2 162 830 A | 2/1986 |
| JP | 60 022922 A | 2/1985 |
| JP | 08057262 | 3/1996 |

OTHER PUBLICATIONS

Higgins, J.B., Zeolites, vol. 8, pp. 446–452, 1998.
Meier, W.M. et al., Zeolites, vol. 12, pp. 459–654, 1992.

* cited by examiner

Primary Examiner—Stanley S. Silverman
Assistant Examiner—Jonas N. Strickland
(74) Attorney, Agent, or Firm—Hunton & Williams LLP

(57) ABSTRACT

The invention concerns a method for purifying flue gases before they are released into the atmosphere of their nitrogen oxides $N_2O$ and $NO_x$ by reaction with ammonia by causing them to circulate at temperatures between 200 and 600° C. on a catalyst based on beta-zeolite loaded with iron. The invention is particularly useful for treating tail gases from factories producing nitric acid.

9 Claims, 8 Drawing Sheets

Effect of the support for the catalytic elimination of $N_2O$
WH = 35000 h$^{-1}$; 3% $O_2$, 2000 ppp $N_2O$, 2000 ppm $NH_3$, temperature increasing (5°C/min)

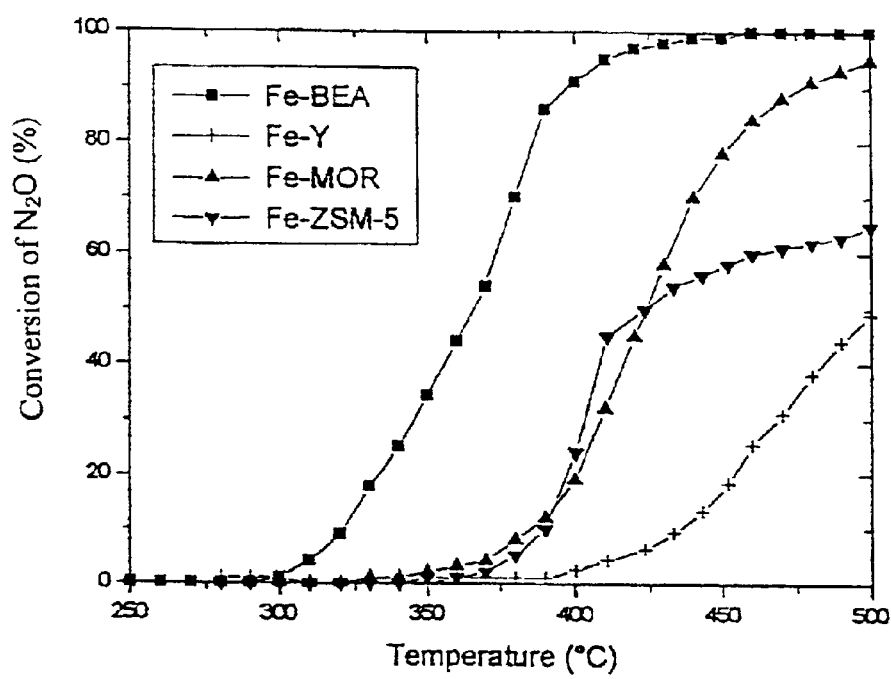
Fig. 1: Effect of the support for the catalytic elimination of $N_2O$
VVH = 35000 h$^{-1}$; 3% $O_2$, 2000 ppp $N_2O$, 2000 ppm $NH_3$, temperature increasing (5°C/min)

Fig. 2a : Influence of the presence of $NH_3$ on the catalytic elimination of $N_2O$ in the presence of 3% $O_2$, VVH =35000 $h^{-1}$, 3% $O_2$, 2000 ppm $N_2O$, He.
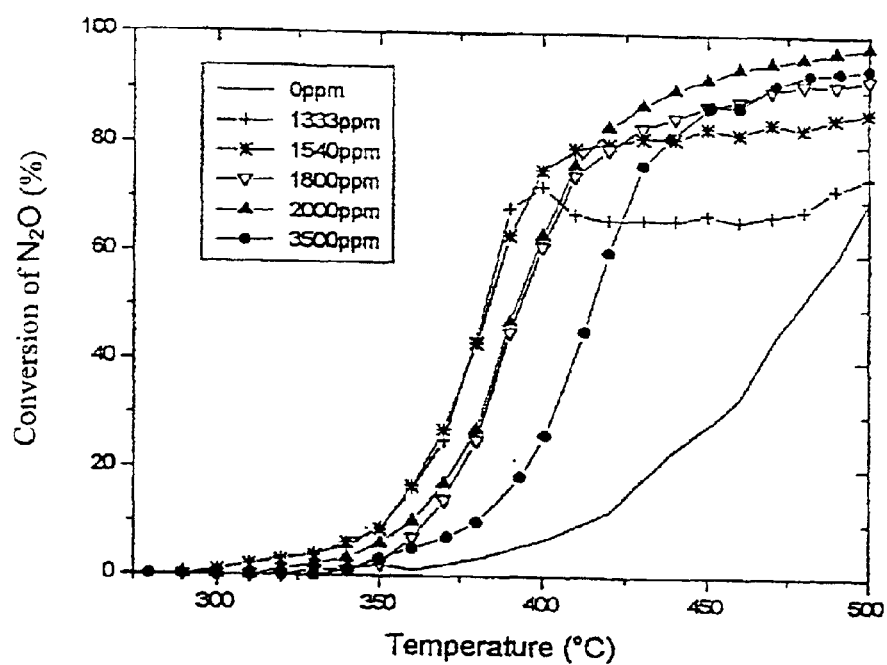

Fig. 2b1: Influence of the NH₃ content on the SCR of N₂O + NO Effect on the NO conversion of N₂O; VVH =35000 h⁻¹; 3% O₂, 2000 ppm N₂O, 500 ppm NO, x ppm
Catalyst: Fe(49) BEA$_e$; temperature increasing (5°C/min)
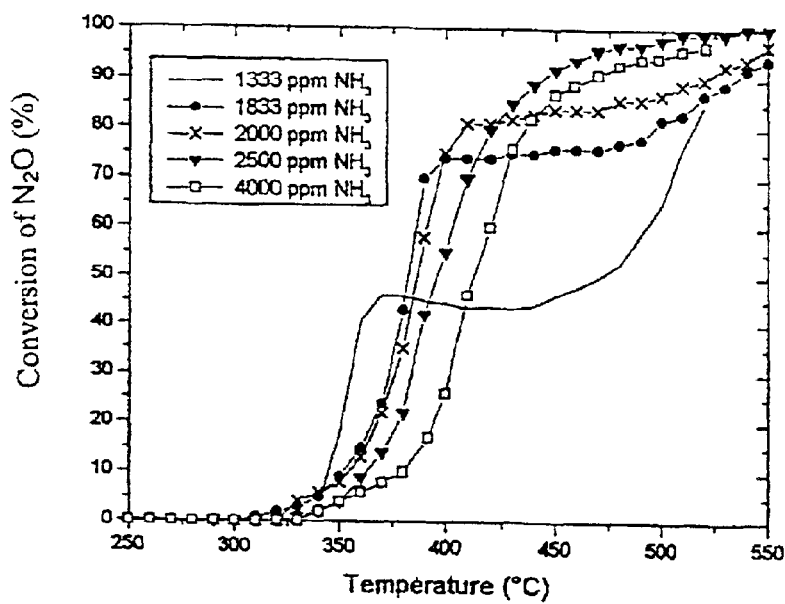

Fig. 2b2: Influence of the NH$_3$ content on the SCR of N$_2$O + NO: Effect on NO conversion
VVH =35000 h$^{-1}$; 3% O$_2$, 2000 ppm N$_2$O, 500 ppm NO, x ppm NH$_3$, He
Catalyst: Fe (49) BEA$_e$; temperature increasing (5°C/min)
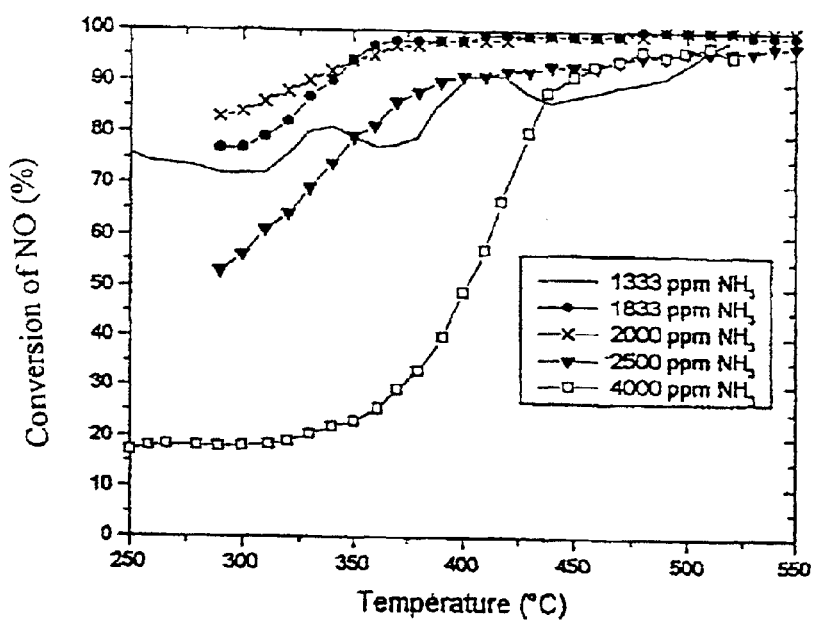

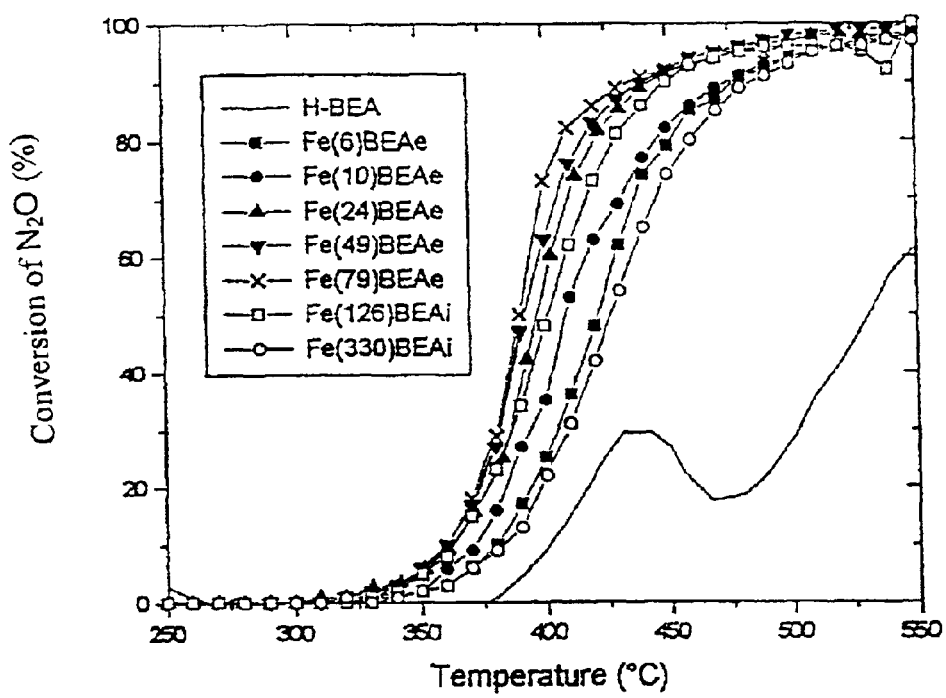
*Fig. 3a:* SCR of $N_2O$ by $NH_3$ (2000 ppm/2000 ppm) in the presence of 3% $O_2$ VVH = 35000 $h^{-1}$; Fe, H-BEA catalyst at different iron exchange rates

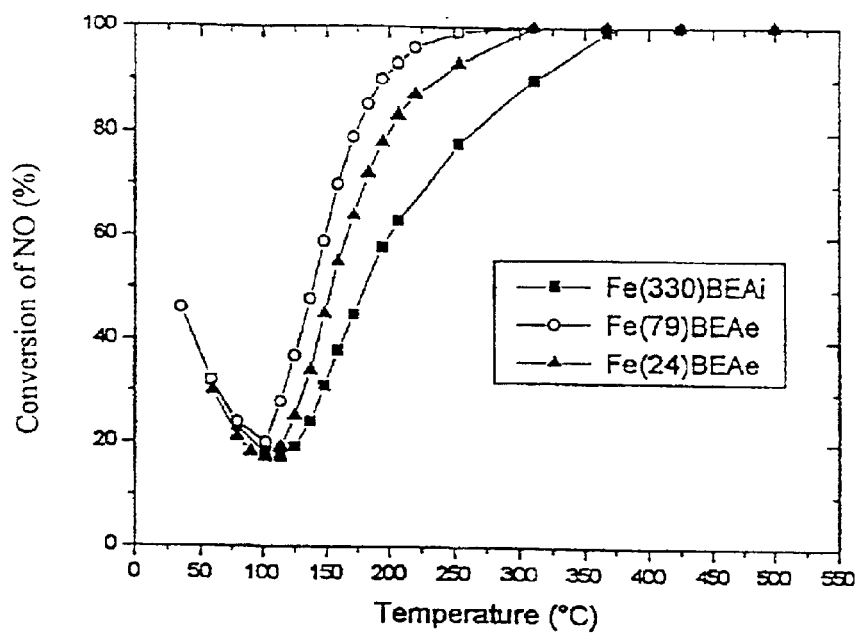
Fig. 3b: Influence of the iron content on the catalytic elimination of NO by $NH_3$ VVH = 10000 $h^{-1}$, 3% $O_2$, 2000 ppm NO, 2000 ppm $NH_3$, He; descending temperature stage (1 hour every 10°C); catalyst: FeBEA at different and exchange rates

*Fig. 3c:* Simultaneous elimination of NO and N$_2$O on FeBEA
VVH = 10000 h$^{-1}$, 3% O$_2$, 13500 pm H$_2$O, 1500 ppm NO, 1000 ppm N$_2$O, 2500 ppm NH$_3$, 1 hour stage every 10°C
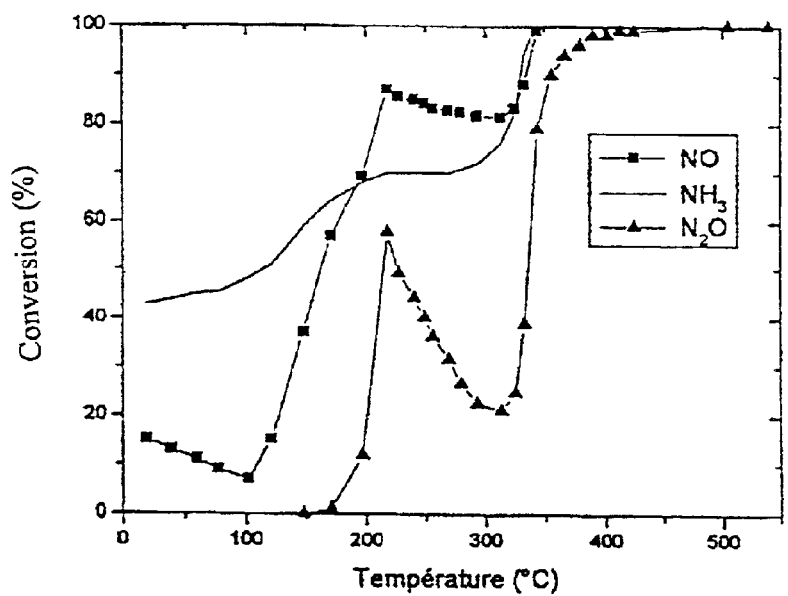

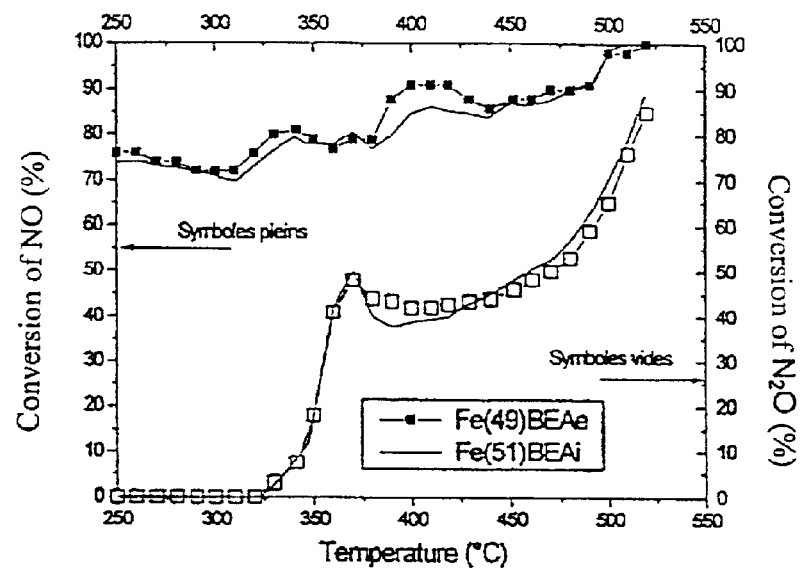
*Fig. 4:* Influence of the preparation method on SCR of $N_2O$ + NO
VVH = 35000 h$^{-1}$, 3% $O_2$, 2000 pm $N_2O$, 500 ppm NO, 1333 ppm $NH_3$; stage 1h/10°C
Catalyst: Fe(49) BEA$_e$; prepared by exchange and Fe(51) BEA; prepared by impregnation

METHOD FOR SIMULTANEOUSLY ABATING NITRIC OXIDES AND NITROUS OXIDES IN GASES CONTAINING THEM

CROSS REFERENCE TO RELATED APPLICATIONS

The present application is a continuation of International Application PCT/FR00/00367 filed Feb. 15, 2000, which claims priority to French patent Application FR99/01999, filed Feb. 18, 1999, the disclosures of both of which are hereby incorporated by reference.

BACKGROUND OF THE INVENTION (i) Field of the Invention

The present invention relates to the area of protection of the environment. It relates to the purification of industrial gas prior to their release to the atmosphere. More specifically, it relates to the treatment of effluent tail gases coming from nitric acid factories that typically contain, besides oxygen at the rate of 1.5 to 5%, from 0.5% to 5% water, from 50 to 6000 ppmv of nitric oxides and from 500 to 1500 ppmv of $N_2O$, wherein the temperature is generally less than 400° C.

(ii) Description of Related Art

The nitric oxides $NO_x$, which include NO and $NO_2$, are polluting gases, principally by reason of their corrosive action. They are for the most part the cause of acid rain. In the synthesis of nitric acid, they are the gases that are produced by oxidation of ammonia by oxygen over platinum at high temperature. They are retained in absorption towers by being transformed there to nitric acid. They escape in the tail gases, where it is known to eliminate them to a suitable level by catalytic ammonia reduction: it is the process called SCR (denoting selective catalytic reduction), which is implemented thanks to zeolitic catalysts. European patent (EP-B-0393917, Engelhard Corporation) reveals that the beta zeolite associated with iron as promoter, is an effective catalyst for the selective reduction of $NO_x$ by ammonia; it makes no reference to nitrous oxide.

Nitrogen protoxide or nitrous oxide, of formula $N_2O$ is likewise produced at the time of the oxidation of ammonia by air oxygen at high temperature, and it also is produced during the SCR destruction of nitric oxides. For a long time, one hardly worried about eliminating it before release to the atmosphere until an awareness developed that it was a gas having a strong greenhouse effect. Japanese patent JP 08057262 (Babcock Hitachi) recommends the use of beta-iron for bringing down nitrous oxide by reduction with ammonia. The inventor does not refer to the $NO_x$ oxides.

The use of a series of catalytic pots in the same installation in order to successively reduce the content of $NO_x$ and $N_2O$ gases is a solution of little satisfaction industrially. There has therefore been sought a unique catalyst which would simultaneously carry out the destruction of $NO_x$ and $N_2O$ by ammonia and, under the same operating conditions, in particular at a temperature less than 400° C., which besides has a hydrothermal stability sufficient at 600° C. to resist temperature periods to which it can be subjected under certain circumstances of its use. An SCR catalyst which in a single operation would permit lowering at the same time of all of the nitrogen oxides and, the protoxide such as the acid oxides, would represent a highly appreciated technical advancement. The idea therefore came to the inventors to inquire whether beta-iron would not be the ideal catalyst for such a treatment, despite the well founded prejudice according to which the ammonia SCR catalysts have only the tendency to manufacture nitrous oxide.

SUMMARY OF THE INVENTION

It has thus been discovered that at the same time one could destroy $N_2O$ and $NO_x$ in gases which contain them as well as oxygen by selective catalytic reduction by ammonia over beta zeolite containing iron (hereinafter FeBEA). The possible reactions of ammonia and of the nitrogen oxides are multiple.

For the reaction $NO/NH_3$, one probably has:

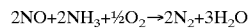

For $NO_2/NH_3$, one would have:

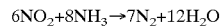

For $N_2O/NH_3$, it was detected by $^{15}NH_3$ nuclear magnetic resonance that two reactions took place:

 (1)

 (2)

The system is therefore one of high stoichiometric complexity, but it can be proposed that the optimal operating conditions of the invention are found when the ammonia is present in a ratio of 0.7 and 1.7 with respect to the nitrogen oxides. The conversions of $N_2O$ and of $NO_x$ are thus total. The leakage of ammonia is non-existent, which is consistent with the known property of iron-zeolites as being excellent catalysts for the oxidation of $NH_3$ to $N_2$, to the extent that the oxygen is present in sufficient quantity. The values 0.7 and 1.4 however are not absolute boundaries. It was simply desired to point out that in reasonable borderline cases, for example a gaseous mixture containing as nitrogen oxide only some NO, the $NH_3$/nitrogen oxides ratio although equal to 1 in theory for an ideal stoichiometry conversion is often observed with the value 0.7; that as far as the upper boundary is concerned, the richest reaction in $NH_3$ is the reduction of the $NO_2$, and that for a mixture that would contain only $NH_3$ and $NO_2$, the ratio would be 8/6. For high $NH_3$/nitrogen oxide ratios (greater than 1.4), the elimination of the nitrogen oxides also remains quite effective and the ammonia is equally consumed but for nothing. Stoichiometric ratios greater than 1.4 are not of industrial interest. In the case of a classical gas mixture coming out from a nitric acid production factory, the $NH_3$/nitrogen oxides ratio ranges in the vicinity of 0.9.

BRIEF DESCRIPTION OF THE DRAWINGS

FIG. 1 shows the effect of the support for the catalytic elimination of $N_2O$.

FIG. 2a shows the influence of the presence of $NH_3$ on the catalytic elimination of $N_2O$ in the presence of 3% $O_2$.

FIG. 2b1 shows the influence of the $NH_3$ content on the SCR of $N_2O+NO$: Effect on the NO conversion of $N_2O$.

FIG. 2b2 shows the influence of the $NH_3$ content on the SCR of $N_2O+NO$: Effect on NO conversion.

FIG. 3a shows the SCR of $N_2O$ by $NH_3$ (2000 ppm/2000 ppm) in the presence of 3% $O_2$.

FIG. 3b shows the influence of iron content on the catalytic elimination of NO by $NH_3$.

FIG. 3c shows the simultaneous elimination of NO and $N_2O$ on FeBEA.

FIG. 4 shows the influence of the preparation method on SCR of $N_2O$ + NO.

DETAILED DESCRIPTION OF PREFERRED EMBODIMENTS

The synthesis of beta-zeolite (BEA) was described in 1967 by Wadlinger R. L. et al. (R. L. Wadlinger, G. T. Kerr and E. J. Rosinski, 1967 in U.S. Pat. No. 3,308,069), and its structure was elucidated independently towards 1988 by Newsam J. M. and coll. (Proc. R. Soc. Lond. A 420, 1588) and Higgins J. B. and coll. (Zeolites, 8, 446, 1988). It is a zeolite which results from the intergrowth of two distinct but intimately bound polytypes, one of tetragonal symmetry (polytype A), the other of monoclinic symmetry (polytype B), both constructed starting from the same centrosymmetric tertiary unit and possessing tridirectional systems of pores formed from 12 tetrahedron cycles The canals are open, (0.64×0.76 nm) and (0.55×0.55 nm) (see W. M. Meier and D. H. Olson, Zeolites, 12 (1992) 459–654). The corresponding structure is visualizable on the internet at http://www.iza-sc.ethz.ch/iza-SC/. It is with the faujasite, one of the most open porous systems among the zeolites.

The beta zeolite of the invention is a BEA in which the Si/Al ratio ranges between 8 and 100, preferably between 8 and 20. It contains iron, and its iron content goes from 0.02% to 8% (by weight).

It is of little importance, it seems, whether the iron be brought by impregnation or by exchange, the resulting solid showing a comparable efficacy in the transformation of $N_2O$ to $N_2$. It is the iron exterior to the grains or present in the canals or the crystal cages which is the active iron. The iron that is incorporated in the network during the zeolite synthesis is in tetrahedral coordination and does not obtain any catalytic activity. It is necessary that there be a minimum (0.02%) of non-tetrahedral iron in the catalyst for it to express its useful properties in the invention. The upper amounts are limited to 8% in a somewhat arbitrary fashion, although the elevated iron contents do not stand in the way of the operation of the catalyst; they are without real industrial interest. Amounts comprising between 0.5 and 3% will be preferred. The catalyst of formula $Fe(79)BEA_e$ of example 1a) and of FIG. 3a with an iron content of 1.50% seems to effect a valid optimum. The impregnation technique is reserved for the FeBEA strongly charged with iron.

Exchange and impregnation are techniques well known to a person skilled in the art and their application to beta zeolite does not give rise to any major problem. In order to prepare an iron beta-zeolite by exchange, iron is introduced, via the solution of one of its hydrosoluble salts, either in a BEA under its typical form, which is that of a partially soda BEA, or in a BEA put beforehand under ammonium form by pre-exchange by $NH_4^+$ which is preferably carried out in order to eliminate Na traces and to obtain a catalyst of slightly higher performance for reduction of nitrogen oxides. These techniques provide powder zeolites.

The catalysts according to the invention are in a rather agglomerated form, a preferred form in industrial practice for reasons of minimizing the loss of gas charge at its passing through of the catalyst bed. The agglomeration of the zeolites is well known to a person skilled in the art. One proceeds by binding together the zeolite powder with a binding agent generally fluidified by water, often comprised of a clay which is at the same time sufficiently plastic to be able to form the agglomerate into setting balls, pastilles by molding or threads by a spinning press, and hardenable by firing in order to provide sufficient cohesion and hardness to agglomerate it. The clays used are kaolinates, attapulgites, bentonites, a halloysite or mixtures of these clays. There can also be used siliceous or aluminous binders. In particular the agglomeration with peptized aluminas gives very resistant granules, this way of agglomeration being possible here because the BEA is not degraded by the acidity of the binder.

After agglomeration, the granules are thermally activated. It is understood that they are subjected to a firing carried out under air, at a temperature of about 400° C., the role of the firing being at the same time to harden the binder, to dehydrate it without hydrothermically degrading it, and in the case of the BEA exchanged starting from an ammonium form, to eliminate a large part of the ammonium ions and to put the zeolite under H form.

One can equally start by agglomerating the partially soda BEA, then hardening it by calcination, and proceeding to the exchanges on the agglomerate. After drying, a second calcination permits putting the BEA/iron under H form if the BEA made use of was taken under ammonium form.

The process of gas treatment according to the invention comprises passing the gas to be purified, of which the range of concentrations of nitrogen oxides, $N_2O$ and $NO_x$ flowing together, extends from 100 to 7000 ppmv, and which besides contains from 1.5 to 5% oxygen and 0.5 to 5% water, ($N_2O$ extending from 50 to 5000 ppm and NO from 50 to 2000 ppm), across a catalyst bed disposed in a reactor maintained at a temperature ranging between 200 and 600° C., at voluminal output velocities per hour (VVH) of 1000 to 50000 $h^{-1}$. The reactor charged with the FeBEA catalyst bed can be an axial or radial flux reactor. The corresponding technology hardly differs from that of the SCR except for replacing the classical catalyst with the BEA-iron based catalyst.

The BEA-iron system was confirmed to be the best system for the conversion of the nitrous oxide, if it is compared to other proposed zeolites of varying recoveries as nitrogen oxide reduction catalysts, such as mordenite-iron or the Y-iron zeolites.

EXAMPLES

In all of the examples provided, the exchange rate (%) of iron was defined as follows: 3 times the molar iron content divided by the molar aluminum content and multiplied by 100. Subsequently, a writing such as Fe(Z)BEA will represent an FeBEA in which the iron exchange rate is Z%.

Example 1

Preparation of FeBEA Powders by Exchange

The BEA zeolite used is the CP814E powder provided by Zeolyst international (PQ corporation). Its $SiO_2/Al_2O_3$ ratio is about 25; it contains 0.05% by weight of $Na_2O$. Its specific surface is about 680 $m^2/g$. This zeolite exhibits X diffraction lines characteristic of a BEA zeolite, such as reported in appendix II of volume 10 of the review Zeolites (1990) and in the article by J. B. Higgins (Zeolites, vol. 8 (1988) 446–452).

1a) Preparation of FeBEA by Simple Exchange

The following $FeBEA_e$ solids were prepared (the index e qualifies the introduction of the iron by an exchange process).

$Fe(5)BEA_e$
$Fe(10)BEA_e$
$Fe(24)BEA_e$
$Fe(49)BEA_e$
$Fe(79)BEA_e$ by mixing 2 g of BEA zeolite powder (PQ CP814E) with 500 $cm^3$ of an aqueous $Fe(NO_3)_3$ solution (0.159 g of Fe(NO$_3$)$_3$, by leaving the mixture under agitation for 24 h, then by separating the solid phase from the liquid phase by centrifugation; by then washing the solid thus prepared with 200 ml of water at pH=5, by centrifuging it again, drying it at 80° C. for 12 hours under air, then calcining it at 500° C. for 24 hours. A powder is obtained which is shown to have the composition of a Fe(49)BEA$_e$ By varying the quantity of ferric solution, other compositions Fe(5)BEA$_e$, Fe(10)BEA$_e$, Fe(24)BEA$_e$, Fe(79)BEA$_e$ were obtained. The respective compositions are:

Fe(5)BEA$_e$, with by weight Si=36.4%, Al=2.67%; Na=0.52%, Fe=0.11%;

Fe(10)BEA$_e$, with by weight Si=35%, Al=2.64%; Na=0.39%, Fe=0.19%;

Fe(24)BEA$_e$, with by weight Si=34.7%, Al=2.43%; Na=0.57%, Fe=0.40%

Fe(49)BEA$_e$, with by weight Si=35.45%, Al=2.65%; Na=0.75%, Fe=0.90%;

Fe(79)BEA$_e$, with by weight Si=34.7%; Al=2.75%; Na=0.50%; Fe=1.50%.

1b) Preparation of FeBEA Powder with Ammonium Pre-exchange

There were mixed 2 g of BEA (PQ CP814E) with 200 cm$^3$ of a 2M solution of NH$_4$NO$_3$ and the mixture brought to reflux for 24 h. The solid phase is then washed with exchanged water and dried at 80° C. to give NH$_4$-BEA$_a$ (the index a qualifies the double ammonium exchange).

There were mixed 2 g of this NH$_4$-BEA with 500 cm$^3$ of an aqueous Fe(NO$_3$)$_3$ solution (0.159 g of Fe(NO$_3$)$_3$) and the mixture is left under agitation for 24 h, after which the solid phase is separated from the liquid phase by centrifugation. The solid is washed with 200 ml of water at pH=5. The mixture is again centrifuged and the solid is first dried at 80° C. for 12 hours under air then calcined at 500° C. for 24 hours. A powder is obtained which is shown to have the composition of a Fe(49)BEA$_a$ with by weight Si=35.6%, Al=2.8%, Na=<0.05%, Fe=1%.

Example 2

Preparation of Iron Beta-zeolite Powder by Impregnation of the Iron Salt

The following FeBEA solids were prepared (the index i qualifies the introduction of the iron by an impregnation process):

Fe(51)BEA$_i$

Fe(126)BEA$_i$

Fe(169)BEA$_i$

Fe(330)BEA$_1$ by impregnation of the BEA (PQ CP814E) zeolite according to the following operative process.

There is impregnated 2 g of BEA with 20 ml of three aqueous solutions of Fe(NO$_3$)$_3$ containing respectively 0.130; 0.389; 0.519; 1,038 g of Fe(NO$_3$)$_3$. The solid is then dried at 80° C. then calcined under air at 500° C.

Powders are obtained which are shown in analysis to have the composition of:

Fe(51)BEA$_i$, with by weight Si=33.0%, Al=2.85%; Na=0.70%, Fe=1.00%

Fe(126)BEA$_i$, with by weight Si=33.5%, Al=2.70%; Na=0.55%, Fe=2.35%

Fe(169)BEA$_i$, with by weight Si=33.0%, Al=2.75%, Na=0.50%, Fe=3.20%

Fe(330)BEA$_i$, with by weight Si=32.6%, Al=2.60%; Na=0.85%, Fe=5.25%.

Example 3

Reduction of the N$_2$O— Comparative Efficacy of Various Zeolites (FIG. 1)

The efficacy of the Fe(49)BEA$_e$ was compared to other iron zeolites wherein the introduction of the iron was carried out by exchange according to the process described in example 1 without passing by the ammonium pre-exchange (Y-iron, Mordenite-iron, ZSM5-iron). The examples that follow make reference to catalytic tests at programmed temperature. The present profiles were obtained under variable conditions, but wherein the common points are here expressed:

temperature evolution from 25 to 550° C., at the rate of 5° C. per minute, or a test at temperature stages descending from 550 to 25° C., with 1 hour stages every 10° C.

detection and analysis of the gas effluents are carried out with the help of a quadropolar type mass spectrometer (QMS 200 of Balzers);

the catalyst sample (75 mg) is first activated at 550° C. for an hour after climbing in temperature at the rate of 10° C. per minute in air (flow rate 30 cm$^3$.min$^{-10}$);

the gaseous mixture to be purified comprises from 3% O$_2$, 0–2000 ppmv N$_2$O, 0–4000 ppmv NH$_3$, 0–1000 ppmv of NO, 0–3% H$_2$O, in helium whose flow rate varies so as to correspond to VVHs varying from 10000 h-1 to 35000 h-1.

A 50% conversion is achieved at 365° C. for FeBEA whereas temperatures of 430° C., 430° C. and 500° C. are necessary for the Fe-ZSM5, Fe-MOR and Fe—Y zeolites respectively. This figure shows that the N$_2$O conversion profile of the FeBEA is shifted between 50° C. and 140° C. towards low temperatures, according to the conversion, as compared to other iron zeolites. This result confirms that the iron beta zeolite is the must active in eliminating N$_2$O in the presence of ammonia.

Example 4

Influence of the Ammonia Content on the N$_2$O Reduction (FIG. 2a)

The effect of the ammonia concentration in reduction in N$_2$O programmed temperature was carried out in the presence of Fe(49)BEA$_e$ under the following conditions: 2000 ppmv N$_2$O, 1333 to 3500 ppmv NH$_3$, 3% O$_2$ and a voluminal velocity per hour of 35000 h$^{-1}$.

In the absence of ammonia, the iron beta zeolite is hardly active in eliminating N$_2$O. A NH$_3$/N$_2$O ratio=0.9 (1800 ppm NH$_3$, 2000 ppm N$_2$O) seems necessary in order to achieve satisfactory conversions (>80%). Too high an ammonia concentration (ex. 3500 ppm, NH$_3$/N$_2$O)=1.75) renders the reductant activity of the iron beta-zeolite less effective.

Example 4 bis

Influence of the Ammonia Content on the Simultaneous Reduction of N$_2$O and NO (FIG. 2b)

The effect of the ammonia concentration in reduction in programmed temperature of an N$_2$O, NO mixture was carried out in the presence of Fe(49)BEA$_e$ under the following conditions: 2000 ppmv N$_2$O, 500 ppmv NO, 1333 to 3500 ppmv NH$_3$, 3% O$_2$ and a voluminal velocity per hour of 35000 h$^{-1}$.

The evolution of the N$_2$O content can be read in FIG. 2b1 and that of the NO content in FIG. 2b2. As far as the conversion of $N_2O$ is concerned, it is noted as in the case of $N_2O$ alone that a $NH_3$/nitrogen oxides ($N_2O+NO$) ratio=0.8 (2000 ppmv to $NH_3$, 2000 ppmv $N_2O$, 500 ppmv NO) is necessary in order to achieve satisfactory conversions (>80%). It can also be noted that under inferior stoichiometric conditions ($NH_3$/nitrogen oxides<0.8), the ammonia permits preferential consumption of NO, the $N_2O$ no longer being destroyed even when in the remaining proportions of ammonia. As far as conversion of NO is concerned, too high an excess of $NH_3$ ($NH_3$/NO=8, 4000 ppmv $NH_3$, 500 ppmv NO) strongly diminishes the efficacy to reduce NO, but all the excess $NH_3$ introduced is transformed to $N_2$.

Example 5

Influence of the Beta-iron Iron Content

The effect of the iron content of the beta-zeolite was analyzed by programmed temperature reduction of $N_2O$ (FIG. 3a) of NO (FIG. 3b) and of a $N_2$/NO mixture (FIG. 3c) under the following conditions: 2000 ppmv $N_2O$, 2000 ppmv $NH_3$, 3% $O_2$; 2000 ppmv $N_2O$, 2000 ppmv $NH_3$, 3% $O_2$, 1500 ppmv $N_2O$, 1000 ppmv NO, 2000 ppmv $NH_3$, 3% $O_2$, 2% $H_2O$ and a voluminal velocity per hour of 35000 $h^{-1}$.

It is observed that an exchange rate ranging between 25 and 79% permits obtaining the best activity at the lowest temperature.

Example 6

Influence of the Method of Iron Introduction
(FIG. 4)

The nature of the way of introducing iron into the Beta-zeolite was examined by programmed temperature reduction of $N_2O$ under the following conditions: 2000 ppmv $N_2O$, 2000 ppmv $NH_3$, 3% $O_2$ and a voluminal velocity per hour of 10000 $h^{-1}$.

Regardless of what the technique is for introducing iron, FeBEAs are obtained having comparable efficacy in the transformation of $N_2O$ to $N_2$.

What is claimed is:

1. Process for removing nitric oxides ($NO_x$) and nitrous oxide ($N_2O$) from a gas comprising:
    adding an amount of ammonia to said gas, said gas comprising $NO_x$, $N_2O$, oxygen and water, such that the amount of ammonia is at a value 0.7<X<1.4, wherein X is the voluminal ratio of ammonia/nitrogen oxides;
    causing said gas to circulate at temperatures ranging between 200 and 600° C., on a catalyst comprising a iron beta-zeolite.

2. Process according to claim 1, wherein said gas comprises between 100 and 7000 ppmv of $NO_x$ and $N_2O$.

3. Process according to claim 1, wherein said iron beta-zeolite comprises an iron beta-zeolite granule and an agglomeration binder.

4. Process according to claim 1 in which the iron beta-zeolite is a beta zeolite of Si/Al molar ratio ranging between 8 and 100, charged with iron by impregnation or exchange, in which the content by weight of iron ranges between 0.02 and 8%.

5. Process according to claim 4, wherein the Si/Al molar ratio ranges between 8 and 20.

6. Process according to claim 4, wherein the content by weight of iron ranges between 0.5–3%.

7. Process according to claim 1, in which said gas circulates over the iron beta catalyst at voluminal velocities per hour (VVH) from 1000 to 50000 $h^{-1}$.

8. Process according to claim 1, wherein the volume content of oxygen ranges between 1.5 and 5% and the volume content of water between 0.5 and 5%.

9. Process according to claim 1, in which the gas is a tail gas from a nitric acid production factory.

* * * * *